(12) United States Patent
Lai et al.

(10) Patent No.: US 10,740,093 B2
(45) Date of Patent: Aug. 11, 2020

(54) ADVANCED PACKAGING TECHNIQUES FOR IMPROVING WORK FLOWS

(71) Applicant: Dropbox, Inc., San Francisco, CA (US)

(72) Inventors: John Lai, San Francisco, CA (US); Joshua Kaplan, San Francisco, CA (US); Sujay Jayakar, San Francisco, CA (US); Bryon Ross, Belmont, CA (US)

(73) Assignee: Dropbox, Inc., San Francisco, CA (US)

( * ) Notice: Subject to any disclaimer, the term of this patent is extended or adjusted under 35 U.S.C. 154(b) by 184 days.

(21) Appl. No.: 15/254,866

(22) Filed: Sep. 1, 2016

(65) Prior Publication Data
US 2018/0060065 A1    Mar. 1, 2018

(51) Int. Cl.
*G06F 8/71*    (2018.01)

(52) U.S. Cl.
CPC ..................... *G06F 8/71* (2013.01)

(58) Field of Classification Search
CPC .. G06F 7/78; G06F 8/00–78; G06F 9/44–455; G06F 11/36
See application file for complete search history.

(56) References Cited

U.S. PATENT DOCUMENTS

| | | | |
|---|---|---|---|
| 7,313,792 B2 | 12/2007 | Buban et al. | |
| 9,092,224 B2 | 7/2015 | Bartlow et al. | |
| 9,112,936 B1 * | 8/2015 | Poletto | H04L 29/0809 |
| 9,134,965 B2 | 9/2015 | Ravel | |
| 2013/0305214 A1 | 11/2013 | Martineau | |
| 2013/0339928 A1 | 12/2013 | Trofin et al. | |
| 2014/0026086 A1 * | 1/2014 | Zuverink | G06F 9/451 |
| | | | 715/765 |
| 2015/0143337 A1 * | 5/2015 | Bauer | G06F 8/34 |
| | | | 717/122 |
| 2015/0154011 A1 * | 6/2015 | Ceng | G06F 8/51 |
| | | | 717/137 |
| 2016/0055014 A1 * | 2/2016 | Gallimore | G06F 9/44521 |
| | | | 719/320 |
| 2016/0132303 A1 * | 5/2016 | de Icaza | G06F 8/447 |
| | | | 717/146 |
| 2016/0149988 A1 * | 5/2016 | Pang | G06F 3/0481 |
| | | | 715/234 |
| 2016/0232334 A1 * | 8/2016 | Kosovan | G06F 21/121 |
| 2016/0274875 A1 * | 9/2016 | Farooqi | G06F 8/36 |
| 2017/0017354 A1 * | 1/2017 | Wei | G06F 3/0482 |
| 2017/0039035 A1 * | 2/2017 | Woodward | G06F 8/20 |

* cited by examiner

*Primary Examiner* — Doon Y Chow
*Assistant Examiner* — Timothy P Duncan
(74) *Attorney, Agent, or Firm* — Polsinelli PC

(57) ABSTRACT

Source code of a logical segment of a codebase can be isolated from other portions of the codebase yet the logical segment and the other portions may have mutual dependencies. Packaging multiple versions of the logical segment and the other portions of the codebase to be compilable as a single binary file can simplify the development, testing, and release work flows of the codebase. For example, development, evaluation, and deployment of the logical segment and the other portions of the code base can run on different schedules. As another example, a provider of the codebase can control which version of the logical segment computing devices execute.

25 Claims, 6 Drawing Sheets

ADVANCED PACKAGING TECHNIQUES FOR IMPROVING WORK FLOWS

TECHNICAL FIELD

The present technology pertains to version control and release engineering, and more specifically pertains to packaging multiple versions of a logical segment of a codebase and, following deployment of the package, controlling execution of a specified version of the logical segment.

BACKGROUND

Release engineering generally concerns building, packaging, and distributing a content item in a reproducible and consistent manner. In the context of software development, release engineering can involve creating and configuring processes and tools to automate the compilation, testing, packaging, and deployment of source code into finished products or software components (e.g., libraries, plug-ins, drivers, or other stand-alone units of software). Release engineering can also include distribution, monitoring, and maintenance of released products or components.

An important tool for coordinating various release engineering tasks is a version control system (VCS) (sometimes also referred to as a revision control system (RCS) or as a source code control system (SCCS) if operated only for source code and related data). A VCS can track the history and attribution of a content item or collection of content items over time and enable retrieval of a specific version of the content item or collection. A VCS can store various types of content, such as metadata, text, image, video, audio, or other binary files, to a repository (sometimes referred to as a repo) that is accessible to multiple users to allow the users to work on the content concurrently and, preferably, in a non-blocking manner. For example, a VCS can provide a content producer her own sandbox of the content, share her work in progress with other users and request feedback from the users, update an authoritative version of the content (sometimes referred to as the trunk, master, mainline, or baseline) with her work in progress but ensure the work does not conflict with others, and facilitate merging of changes and synchronization of the content.

One of the responsibilities of release engineering can include establishing work flows or processes regarding how development, quality assurance, and operations teams should use a VCS during the development and release cycle of a software project. For example, a work flow may define a branching and release strategy, such as maintaining a single branch and cutting releases from this branch (sometimes referred to as trunk-based development) or maintaining a hierarchy of branches based on their relative stability (e.g., alpha, beta, stable), "graduating" branches after they achieve a specified degree of maturity, and cutting releases from the most stable branch. A development and release work flow may also dictate how often to commit source code or how often to release new versions of a product. One popular development and release strategy, known as continuous integration or continuous delivery/deployment (CI/CD), encourages merging of source code early and often during development, such as once or several times a day, and providing releases every day or every few days. Merge conflicts inevitably arise when multiple users are working on a common project; and over time integrating code can require intensive human labor such as due to the complexities of code dependencies, the necessity for collaboration across multiple development teams and projects, and the assurance that merged code functions properly via robust testing requirements. CI/CD ensures that parallel tracks of development do not veer too far apart from one another; and CI/CD essentially decomposes a big problem, e.g., integrating and testing source code from weeks or months of development on multiple branches, into smaller, more manageable pieces, e.g., merging and testing source code from daily work on different branches.

Observance of the principles of CI/CD can be straightforward when a project has a uniform development, testing, and release cycle or when a product consists of discrete and substantially or completely self-contained modules but many software architectures comprise interdependent components that may require different periods of time for development and testing. For example, a conventional web browser typically includes user interface (UI) functionality for handling user input (e.g., menu toolbar, address bar, search toolbar, bookmarks, etc.), rendering functionality for interpreting mark-up language, scripts, and stylesheets and generating a layout corresponding to these elements, and an interface between the UI functionality and the rendering functionalities. These web browser components are often highly integrated with one other and dependent on a common set of code (e.g., display/graphics or network interfaces. While it may be possible to develop, test, and release new versions of the web browser UI functionality over short periods of time, it is unlikely that development of the UI-rendering interface and rendering functionality can run on the same schedule. Various types of software may face the same issue, such as an anti-virus program having scanning functionality that has a different life-cycle from other program features or a client application, of an online synchronized content management system (CMS), whose synchronization functionality may require different lengths of time for development and testing than other functionalities.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for packaging multiple versions of a first logical segment of a codebase (e.g., a collection of source code and other related data, such as configuration files, machine-generated data, pre-built binary library files, etc., used to build a software system, application, or component) and, controlling execution of a specified version of the logical segment upon execution of a binary file compiled from the package. A logical segment of a codebase can group similar functionality provided by the codebase but may not necessarily be a substantially or completely self-contained module. For example, a logical segment can have dependencies on other segments of the codebase. That is, at least a portion of the source code of the logical segment may require at least a portion of the source code of other segments of the codebase for installation and/or execution. Likewise, other segments of the codebase can have dependencies on a logical segment. That is, at least a portion of the code of the other segments of the codebase may require at least a portion of the code of the logical segment in order to compile and/or execute. Thus, a logical segment of the codebase and other segments of the codebase have mutual dependencies.

In some cases, a build tool, build automation server, package manager, dependency manager, or the like, may retrieve multiple versions of a first logical segment and a version of the other segments of the codebase from a source code repository, such as a repository of a version control system (VCS), revision control system (RCS), source code control system (SCCS), or other content management system (CMS), and package together the multiple versions of the first logical segment and the other segments of the codebase. The package may be deployed in various ways, such as part of an installation package that, upon compilation, generates an executable file; a pre-built executable file; a clone or a checkout of a source code control repository including a build tool for compiling the source code; a software development kit (SDK); a virtual machine or container image; or other suitable deployment.

In certain situations, such as when the package includes source code, the package can be compiled on a computing device to generate an executable file. In other situations, the package may be pre-compiled and distributed to the computing device as an executable file. In either event, the executable file can include multiple execution paths corresponding respectively to the multiple versions of the first logical segment. The computing device can run the executable file, and the computing device may execute one of the execution paths or another depending on various factors. These factors can include user information associated with the computing device, characteristics of the computing device (e.g., manufacturer or model, operating system, network connection provider, network connection speed, etc.), configuration data deployed with a package or otherwise distributed to the computing device, a developmental state of the first logical segment (e.g., alpha, beta, stable, etc.), among many possibilities. In one variation, the executable file may be a client application, and a server application in communication with the client application can select the execution path and direct the client application to run the selected execution path.

In some embodiments, the codebase may correspond to a client application of an online synchronized content management system (CMS) and the first logical segment may correspond to synchronization functionality that communicates with the CMS to synchronize local content items of the computing device with content items of a user account of the content management system. When a network connection is available to the client application, the client application may initiate a synchronization protocol with the CMS by sending a synchronization request. Upon receiving the synchronization request, the CMS may include data in a synchronization response specifying the version of the client-side synchronization functionality to execute. The CMS may select the client-side synchronization functionality based on some of the factors discussed throughout herein (e.g., user information, client device information, configuration data, developmental state, etc.). For example, the CMS may define user account groups or cohorts (e.g., free, 'pro,' and business user accounts or super-privileged, privileged, and regular user accounts) and select a client-side synchronization implementation based on a user account group or cohort to which a requestor belongs. The CMS may also determine which versions of the client-side synchronization functionality to package for deployment on the basis of user account group or cohort or other factors discussed throughout herein. In some cases, the CMS may select a client-side synchronization implementation on a per request basis. In other cases, the CMS may select the client-side synchronization functionality on per session (e.g., TCP session) basis.

It should be understood that the example of the codebase corresponding to a client application of a CMS is provided for illustration purposes only, and it will be appreciated by one of ordinary skill in the art that the technology disclosed herein is applicable to other types of software systems, applications, and components.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
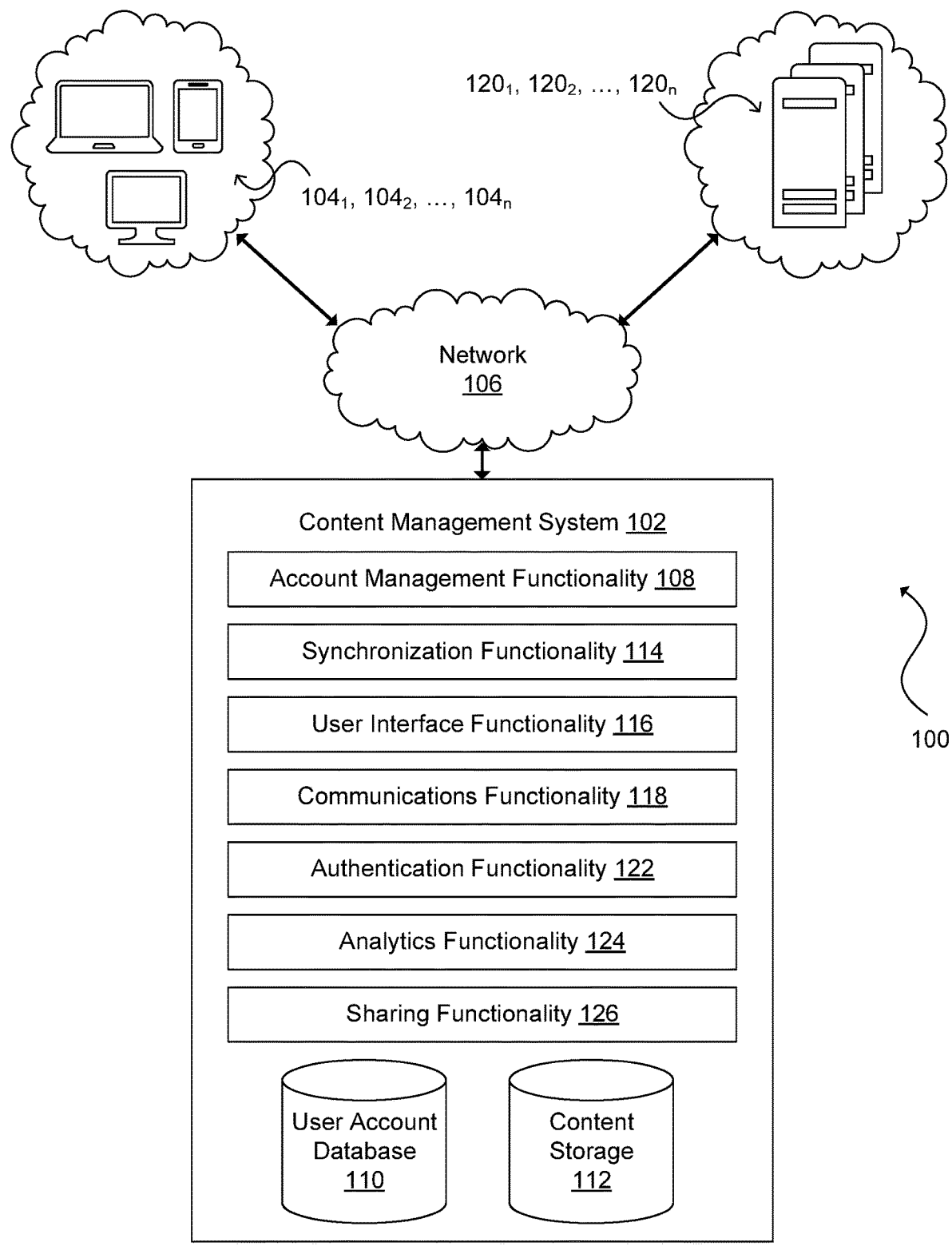
FIG. 1 shows an exemplary configuration of devices and a network.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for accommodating variations in the development, testing, and release schedules of interdependent components of a codebase. One conventional approach for enabling a different development and release life-cycle for an interdependent component of a codebase is to branch or fork development of that component and merge with the original branch when development is complete. Developers could continue to practice CI/CD by continuously rebasing from the original branch. Such an approach, however, may require users to compile, run, and test multiple versions of the codebase. This can be especially burdensome for end users. Further, running multiple versions of a software application is not possible on some computing systems.

Another traditional approach is to refactor the code of the interdependent component requiring a separate development, testing, and release schedule as a submodule or a new repository nested within the original repository. This can complicate developer workflow and require coordination between a first team working on the interdependent component and a second team working on other parts of the codebase. For example, for changes made to the interdependent component to trigger a rebuild of the codebase for the second team, the first team must update revision pointers in the original repository to the changed source code in the nested repository. This may also prevent changes that span the original repository and the nested repository.

Systems and methods in accordance with various embodiments of the disclosed technology may overcome one or more of the aforementioned and other deficiencies experienced in conventional approaches for establishing different development, testing, and release timelines for an interdependent component of a codebase from other portions of the codebase. A single source code repository can be maintained for the codebase. However, source code for a logical segment requiring an independent work flow can be isolated from the other portions of the codebase. For example, the source code for the logical segment may be placed in a subdirectory of the codebase, e.g., 'codebase/segment.' The source code repository can also include configuration information for determining which versions or revisions of the logical segment to package with the other portions of the codebase.

Table 1 shows exemplar configuration information or an exemplar release schema. In this example, different user account groups or cohorts receive different packages of the codebase. A package of the codebase for 'super-privileged' user accounts includes an 'alpha' version that points to 'revA,' a 'beta' version that points to 'revB,' and a 'stable' version that points to 'revC'; a package for 'privileged' users includes a 'beta' version that points to 'revB' and a 'stable' version that points to 'revC'; and a package for 'regular' user accounts includes only a 'stable' version that points to 'revC.'

TABLE 1

Exemplar Configuration Information

| | |
|---|---|
| 1: | {'super-privileged': {'alpha': 'revA', 'beta': 'revB', 'stable': 'revC'}, |
| 2: | 'privileged': {'beta': 'revB', 'stable': 'revC'}, |
| 3: | 'regular': {'stable': 'revC'}} |

A build or packaging tool can use the configuration information or release schema to update a directory of the codebase during deployment. For example, source code for the codebase can reside in one source code repository at 'codebase/' and a logical segment can reside in 'codebase/segment.' To create a package for 'super-privileged' user accounts at deployment time, the build or packaging tool can create new subdirectories 'codebase/segment_alpha,' 'codebase/segment_beta,' and 'codebase/segment_stable' and populate the source code of the new subdirectories with source code responding to 'revA,' 'revB,' and 'revC,' respectively. A package for 'privileged' user accounts may include source code for 'revB' and 'revC' in 'codebase/segment_beta' and 'codebase/segment_stable,' respectively. A package for 'regular' user accounts may include source code for 'revC' in 'codebase/segment_stable.' Although the configuration information or release schema of Table 1 uses consistent version names across the packages, other embodiments may define packages having the same version names for different versions of the source code. For example, in another embodiment, the configuration information or release schema may include a 'super-privileged' package that has a 'beta' version that points to 'revX' and a 'privileged' package that has a 'beta' version that points to 'revY' because content management system 102 may not wish to release 'revX' to privileged user accounts.

The codebase can also include new source code for providing an interface between the multiple versions of the logical segment and the other portions of the codebase. For example, the new source code can take the form of a factory pattern (e.g., factory method or abstract factory) in which instantiation logic is hidden from a consumer of the factory but the consumer can call upon the factory to create a type of a data object having an interface known to the consumer, and the factory can create that type of data object at run time. For instance, the factory can receive user account information and instantiate a specified version of the logical segment for the consumer to act upon.

Using such an approach, development of the logical segment can proceed independently from development of other portions of the codebase without the difficulties of working on separate repositories or branches. Further, multiple versions of the logical segment can be deployed and tested from a single executable file at different periods of time, and a provider of the codebase can control which version of the logical segment that computing devices execute.

With respect to implementing various embodiments of the disclosed technology, an exemplary system configuration 100 is shown in FIG. 1, wherein electronic devices communicate via a network for purposes of exchanging content and other data. The system can operate in a wide area network (WAN), such as the Internet. However, the present principles are applicable to a wide variety of network configurations that facilitate the intercommunication of electronic devices. For example, each of the components of system 100 in FIG. 1 can be implemented in a localized or distributed fashion in a private network.

In system 100, a user can interact with content management system 102 (e.g., an online synchronized content management system) through client devices $104_1$, $104_2$, ..., and $104_n$ (collectively, "104") connected to network 106 by direct and/or indirect communication. Content management system 102 can support connections from a variety of different client devices, such as desktop computers; mobile computers; mobile communication devices, e.g. mobile phones, smart phones, tablets; smart televisions; set-top boxes; and/or any other network enabled computing devices. Client devices 104 can be of varying type, capabilities, operating systems, etc. Furthermore, content management system 102 can concurrently accept connections from and interact with multiple client devices 104.

A user can interact with content management system 102 via a client-side application installed on client device $104_i$. In some embodiments, the client-side application can include a component for specifically interacting with content management system 102. For example, the component can be a stand-alone application, one or more application plug-ins, and/or a browser extension. However, the user can also interact with content management system 102 via a third-party application, such as a web browser, that resides on client device $104_i$ and that can be used to communicate with content management system 102. In either case, the client-side application can present a user interface (UI) for the user to interact with content management system 102. For example, the user can interact with content management system 102 via a client-side application integrated with the file system of client device $104_i$ or via a webpage displayed using a web browser application executing on client device $104_i$.

Content management system 102 can enable a user to store content, as well as perform a variety of content management tasks, such as retrieve, modify, browse, and/or share content. Further, content management system 102 can enable a user to access content from multiple client devices 104. For example, client device $104_i$ can upload content to content management system 102 via network 106. Later, client device $104_i$ or another authorized client device $104_j$ can retrieve the content from content management system 102.

To facilitate the various content management services, a user can create an account with content management system 102, such as via account management functionality 108. Account management functionality 108 can utilize user account database 110 to maintain account information, such as profile information for registered users. In some cases, the only personal information in the user profile can be a username and/or email address. However, content management system 102 can also accept additional user information, such as birthday, address, billing information, etc. User account database 110 can also store account management information, such as account type (e.g. free or paid), usage information (e.g., file edit history), maximum storage space authorized, storage space used, content storage locations, security settings, personal configuration settings, content sharing data, etc. Account management functionality 108 can update and/or obtain user account details in user account database 110. Account management functionality 108 can interact with any number of other functionalities of content management system 102.

An account can be used to store "content" or "content items," such as digital data, documents, text files, audio files, video files, etc., from one or more authorized client devices 104. Content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include a photo collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple user accounts may be different for a shared collection.

Content can be stored in content storage 112. Content storage 112 can be a storage device, multiple storage devices, or a server. Alternatively, content storage 112 can be a cloud storage provider or network storage accessible via one or more communications networks, such as network 106. Content management system 102 can hide the complexity and details from client devices 104 so that client devices 104 do not need to know exactly where content items are being stored by content management system 102. In some embodiments, content management system 102 can store content items in the same collection hierarchy as they appear on client device $104_i$. However, in other embodiments, content management system 102 can store content items in a distinct own order, arrangement, or hierarchy. Content management system 102 can store content items in a network attached storage (NAS) device, in a redundant array of inexpensive disks (RAID), etc. Content storage 112 can store content items using one or more partition types, such as FAT, FAT32, NTFS, EXT2, EXT3, EXT4, ReiserFS, BTRFS, and so forth.

Content storage 112 can also store metadata describing content items, content item types, and the relationship of content items to various accounts, collections, or groups. The metadata for a content item can be stored as part of the content item or can be stored separately. In one variation, each content item stored in content storage 112 can be assigned a system-wide unique identifier.

Content management system 102 can decrease the amount of storage space required by content storage 112 via identification of duplicate content items or duplicate segments of content items. Instead of storing multiple copies, content management system 102 can store a single copy in content storage 112 and then use a pointer or other mechanism to link the duplicates to the single copy. Content management system 102 can also provide the ability to undo operations, by using version control for tracking changes to content items, different versions of content items (including diverging version trees), and change history. For example, the change history can include a set of changes that, when applied to an original version of a content item, produce one or more later versions of the content item.

Content management system 102 can support automatic synchronization of content among and between one or more client devices 104 and content management system 102. Synchronization can be platform agnostic. That is, content can be synchronized across multiple client devices 104 of varying type, capabilities, operating systems, etc. For example, client device $104_i$ can include client software, which synchronizes, via synchronization functionality 114, content in client device $104_i$'s file system with content in an associated user account. In some cases, the client software can synchronize any changes to content in a designated collection and its sub-collections, such as new, deleted, modified, copied, or moved content items or collections. The client software can be a separate software application, can be integrated with an existing content management application in the operating system, or can be some combination thereof. In one example of client software that integrates with an existing content management application, a user can manipulate content items directly in a local collection (i.e., stored on client device $104_i$) while a background process monitors the local collection for changes and synchronizes those changes to content management system 102. In addition or alternatively, another background process can identify content that has been updated at content management system 102 and synchronize those changes to the local collection. The client software can provide notifications of synchronization operations, and can provide indications of content statuses directly within the existing content management application. Sometimes client device $104_i$ may not have a network connection available. In this scenario, the client software can monitor the local collection for content item changes and queue those changes for later synchronization to content management system 102 when a network connection is available. Similarly, a user can configure her user account to manually start, stop, pause, or resume synchronization with content management system 102.

Synchronization functionality 114 may support multiple approaches for synchronization, i.e., multiple synchronization protocols and/or multiple implementations of a synchronization protocol. For example, client device $104_i$ or client software residing on client device $104_i$ can include multiple client synchronization implementations for synchronizing content with content management system 102.

When a network connection is available to client device $104_i$, client device $104_i$ may initiate synchronization with content management system 102 via communication with synchronization functionality 114. Upon receiving a synchronization request, synchronization functionality 114 can select a particular client-side synchronization implementation for client device $104_i$ to run. Synchronization functionality 114 can include information identifying the particular client-side synchronization implementation in a synchronization response, and client device $104_i$ will execute that client-side synchronization implementation. Synchronization functionality 114 can specify a client-side synchronization implementation on a per request basis or on a per session basis (e.g., TCP session).

Support for multiple synchronization implementations can have various advantages. For example, a new synchronization implementation may introduce a bug or other error and synchronization functionality 114 can revert back to a previous implementation. Support for multiple synchronization implementations can also allow for differentiated service for different cohorts or user account groups of content management system 102. For instance, costs for computing resources, such as processing, storage, and networking, can vary based on factors such as the number of processors, type of processor (e.g., CPU or GPU), amount of RAM, type of storage (e.g., solid state devices, hard disk drives, or tape), type of network connection (e.g., public Internet or private network), or networking class of service (CoS) or quality of service (Qos) for the computing resources. User accounts of content management system 102 may be divided among different cohorts depending on user preferences for the characteristics of the computing resources utilized for synchronization and/or willingness to pay for those preferences. Synchronization functionality 114 can determine a cohort and a corresponding client-side synchronization implementation for client device $104_i$ based on user account information associated with client device $104_i$.

In addition or alternatively, certain synchronization features may be exposed or hidden depending on a user account's associated cohort. For example, content management system 102 can offer a feature such as application data streaming in which content management system 102 saves state information of an application a user operates upon at a specified frequency (e.g., 1 to 10 minutes) to a user account associated with the user. The user can retrieve application state data from her user account on content management system 102 in the event the application or client device $104_i$ crashes. The user may also recover a specified application state from her user account in cases where the user overwrites data or erases data. Content management system 102 may limit the feature to certain cohorts (e.g., professional or business user accounts) by specifying a particular client-side synchronization implementation that client device $104_i$ should use to communicate with content management system 102.

Content management system 102 can also define cohorts based on the tester type of a user account associated with client device $104_i$, such as whether the user account is a super-privileged user account, a privileged user account, or a regular user account. Content management system 102 can distribute alpha versions, beta versions, and stable versions of a client synchronization engine depending on the tester type associated with the user account and control which version of a client-side synchronization implementation that client device $104_i$ should execute based on the tester type associated with the user account. This can enable canary testing, such as by having synchronization functionality 114 direct client devices 104 of super-privileged user accounts (e.g., employee accounts) or privileged user accounts (e.g., beta tester accounts) to execute an 'alpha' or 'beta' version of a client-side synchronization implementation and directing regular user accounts to a stable version of the client-side synchronization implementation. In one variation, synchronization functionality 114 can use a staggered rollout in which a canary testing cohort (e.g., 10% of user accounts) executes an 'alpha' or 'beta' version of a client-side synchronization implementation and a remaining group of user accounts executes a 'stable version' of the client-side synchronization implementation. Synchronization functionality 114 can gradually increase the number of user accounts using the 'alpha' or 'beta' version of the client-side synchronization implementation until a determination that the 'alpha' or 'beta' version is stable.

Similarly, content management system 102 can perform a/b testing by directing user accounts of one cohort to use a first client-side synchronization implementation and user accounts of another cohort to use a second client-side synchronization implementation. Further, content management system 102 can define cohorts based on other user characteristics (e.g., geographic location, whether the user is a power user or how frequently the user operates the client software, etc.), client device characteristics (e.g., manufacturer or model, operating system, network connection provider, network connection speed, etc.), or other characteristics discussed throughout herein.

A user can view or manipulate content via a web interface generated and served by user interface functionality 116. For example, the user can navigate in a web browser to a web address provided by content management system 102. Changes or updates to content in content storage 112 made through the web interface, such as uploading a new version of a content item, can be propagated back to other client devices 104 associated with the user's account. For example, multiple client devices 104, each with their own client software, can be associated with a single account and content items in the account can be synchronized between each of the multiple client devices 104.

Content management system 102 can include communications functionality 118 for interfacing with various client devices 104, and can interact with other content and/or service providers $120_1$, $120_2$, . . . , and $120_n$ (collectively, "120") via an application programming interface (API). Certain software applications can access content storage 112 via an API on behalf of a user. For example, a software package, such as an application (sometimes referred to as an app) running on a smartphone or tablet computing device, can programmatically make calls directly to content management system 102, when a user provides credentials, to read, write, create, delete, share, or otherwise manipulate content. Similarly, the API can allow users to access all or part of content storage 112 through a web site.

Content management system 102 can also include authentication functionality 122, which can verify user credentials, security tokens, API calls, specific client devices, and so forth, to ensure only authorized clients and users can access content items. Further, content management system 102 can include analytics functionality 124 to track and report on aggregate file operations, user actions, network usage, total storage space used, as well as other technology, usage, or business metrics. A privacy and/or security policy can prevent unauthorized access to user data stored with content management system 102.

Content management system 102 can include sharing functionality 126 for managing the sharing of content, publicly or privately. Sharing functionality 126 can share content publicly by providing access to a content item to any computing device in network communication with content management system 102. Sharing functionality 126 can share content privately by limiting access only to authorized user accounts and by linking a content item in content storage 112 with two or more authorized user accounts so that each authorized user account has access to the content item. Sharing can be performed in a platform agnostic manner. That is, content can be shared across multiple client devices 104 of varying type, capabilities, operating systems, etc. Content can also be shared across varying types of user accounts.

While content management system 102 is presented with specific components, it should be understood by one skilled in the art, that the architectural configuration of content management system 102 is simply one possible configuration and that other configurations with more or less components are also possible.

Figure 2:
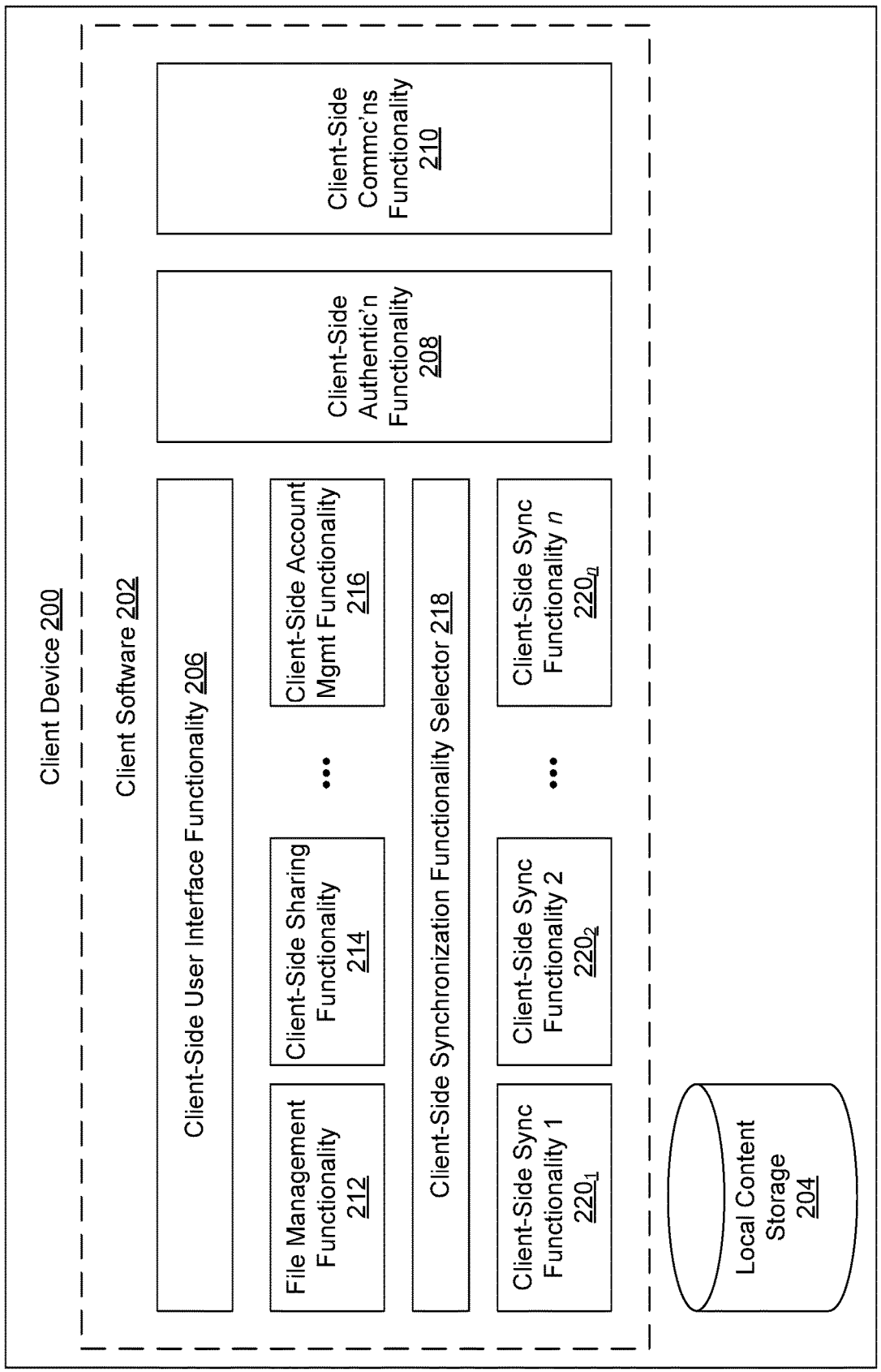
FIG. 2 shows an exemplary configuration of client software.

FIG. 2 shows an exemplary configuration of client device 200, which can be one example configuration of client device $104_i$ shown in FIG. 1. As discussed above, client device 200 can include a number of components and/or client-side applications (e.g., client software 202) for accessing functionality provided by content management system 102 of FIG. 1. The components and/or applications can include one or more databases or storage structures (e.g., local content storage 204) for storing data relevant to the operation of the system, and one or more modules and/or client applications for interacting with the storage structures and/or controlling the features provided by content management system 102. Each of the components in FIG. 2 is discussed in more detail below; however, it should be understood by one skilled in art, that client device 200 is simply one possible configuration and that other configurations with more or less components are also possible.

Client device 200 can include client software 202 and local content storage 204. Client software 202 is a stand-alone application in this example, but client software 202 can also be a software component, such as a library, plug-in, driver, or other stand-alone unit of software in other examples. Client software 202 can be deployed as part of an installation package that, upon compilation, generates an executable file; a clone or a checkout of a source code control repository or other source code deployment; an SDK; a virtual machine or container image; or another manner of deployment.

Local content storage 204 can be a part of a native file system of client device 200, and can include one or more local content items that are in synchronization with content items of a user account of content management system 102. For example, client software 202 may designate a directory (e.g., folder, partition, segment, drive, bin, repository, container, or other similar data structure) within local content storage 204 by default or a user may designate the directory as a root directory of client software 202. When a user changes content items in root (e.g., deletes, modifies, copies, moves, or otherwise manipulates content items), client software 202 can synchronize those changes to content management system 102. Likewise, when an authorized user changes content items of the user account in content management system 102, content management system 102 can synchronize those changes to root.

Client software 202 can include client-side user interface functionality 206, which may generate one or more windows or views by which a user may interact with client software 202. Client-side user interface functionality 206 may also capture user input and direct the user input to other functionalities of client software 202 for handling the user input. Thus, client-side user interface functionality 206 may be highly interdependent with other functionalities of client software 202. For example, one of the windows or views generated by client-side user interface functionality 206 may include a graphical representation (e.g., a file explorer or other file management application) of local content items of local content storage 204 synchronized with content items of content management system 102. When a user makes changes to the local content items, client-side user interface functionality 206 may have dependencies on file management functionality 212, which can be an interface to a native file system of client device 200 and may handle manipulations of local content items. Client-side user interface functionality 206 may call upon file management functionality 212 to update the state of local content storage 204 in order to provide an updated window or view of the local content items. Similarly, when an authorized user manipulates shared content items of content management system 102, client-side user interface functionality 206 may have dependencies on client-side sharing functionality 214 for determining the correct state of the shared content items in order to generate an updated window or view of shared local content items of client device 200 in synchronization with the shared content items of content management system 102.

Client software 202 can also include client-side authentication functionality 208 for receiving user credentials, security tokens, biometric data, and the like, from a user, and transmitting this information to content management system 102 to verify the identity of the user. Other functionalities of client software 202 may have dependencies on client-side authentication functionality 208. For example, client-side authentication functionality 208 can include an interface that client-side account management functionality 216 must interact with before client-side account management functionality 216 can access any user account information maintained by content management system 102. In turn, client-side authentication functionality 208 may have dependencies on other functionalities of client software 202. For example, client-side authentication functionality 208 may require network functionality provided by client-side communications interface 210 to communicate with content management system 102 or may rely on input from fields or similar functionality provided by client-side user interface functionality 206 for receiving a user name and password.

As discussed above, a client application, such as client software 202, may include multiple client-side synchronization implementations $220_1$, $220_2$, . . . , and $220_n$ (collectively, "220") for synchronizing local content items stored on a client device, such as client device 200, and content items of a user account of content management system 102. In this example, client software 202 also includes client-side synchronization functionality selector 218 for other functionalities of client software 202 to call upon to receive an instance of client-side synchronization functionality $220_i$. Client-side synchronization functionality selector 218 may follow a factory method pattern (e.g., an interface for creating a data object and deferring instantiation to subclasses) or an abstract factory pattern (e.g., an interface for creating families of related or dependent objects without specifying concrete classes).

In one example implementation of client-side synchronization functionality $220_i$, client-side synchronization functionality $220_i$ can communicate with local content storage 204 to identify local content items that are not in synchronization with content management system 102. Upon identifying unsynchronized content items, client-side synchronization functionality $220_i$ can upload the unsynchronized content items to content management system 102. In some embodiments, client-side synchronization functionality $220_i$ can begin upload of an unsynchronized local content item immediately upon identifying that local content item is out of sync with a corresponding content item of content management system 102.

Alternatively, in some embodiments, client-side synchronization functionality $220_i$ can limit the number of concurrent content item uploads to content management system 102. For example, client-side synchronization functionality $220_i$ may only upload one local content item at a time such that when upload of that local content item completes, upload of a next local content item may begin. Alternatively, in some embodiments, client-side synchronization functionality $220_i$ can concurrently upload up to a specified number of local content items (e.g., 2, 3, 4, etc.).

In some embodiments, client-side synchronization functionality $220_i$ can queue local content items identified as unsynchronized with content management system 102. For example, upon identifying an unsynchronized local content item, client-side synchronization functionality $220_i$ can add that local content item to a synchronization queue of local content items to be uploaded to content management system 102. The synchronization queue can be stored in local content storage 204. To add a local content item to the synchronization queue, in some embodiments, client-side synchronization functionality $220_i$ can add an identifier associated with that local content item to the synchronization queue. The client-side synchronization functionality $220_i$ can subsequently use the identifier to locate the queued local content item in local content storage 204.

In some embodiments, client-side synchronization functionality $220_i$ can upload the local content items in the synchronization queue in the order in which they are received. Alternatively, in some embodiments, client-side synchronization functionality $220_i$ can upload the local content items in the synchronization queue in reverse order, such that the local content item most recently added to the synchronization queue is uploaded first.

Client-side synchronization functionality $220_j$ may operate differently from client-side synchronization functionality $220_i$ in at least one respect. Client software 202 may switch between executing client-side synchronization functionality $220_i$ and executing client-side synchronization functionality $220_j$ based on the various scenarios discussed throughout herein.

Figure 3:
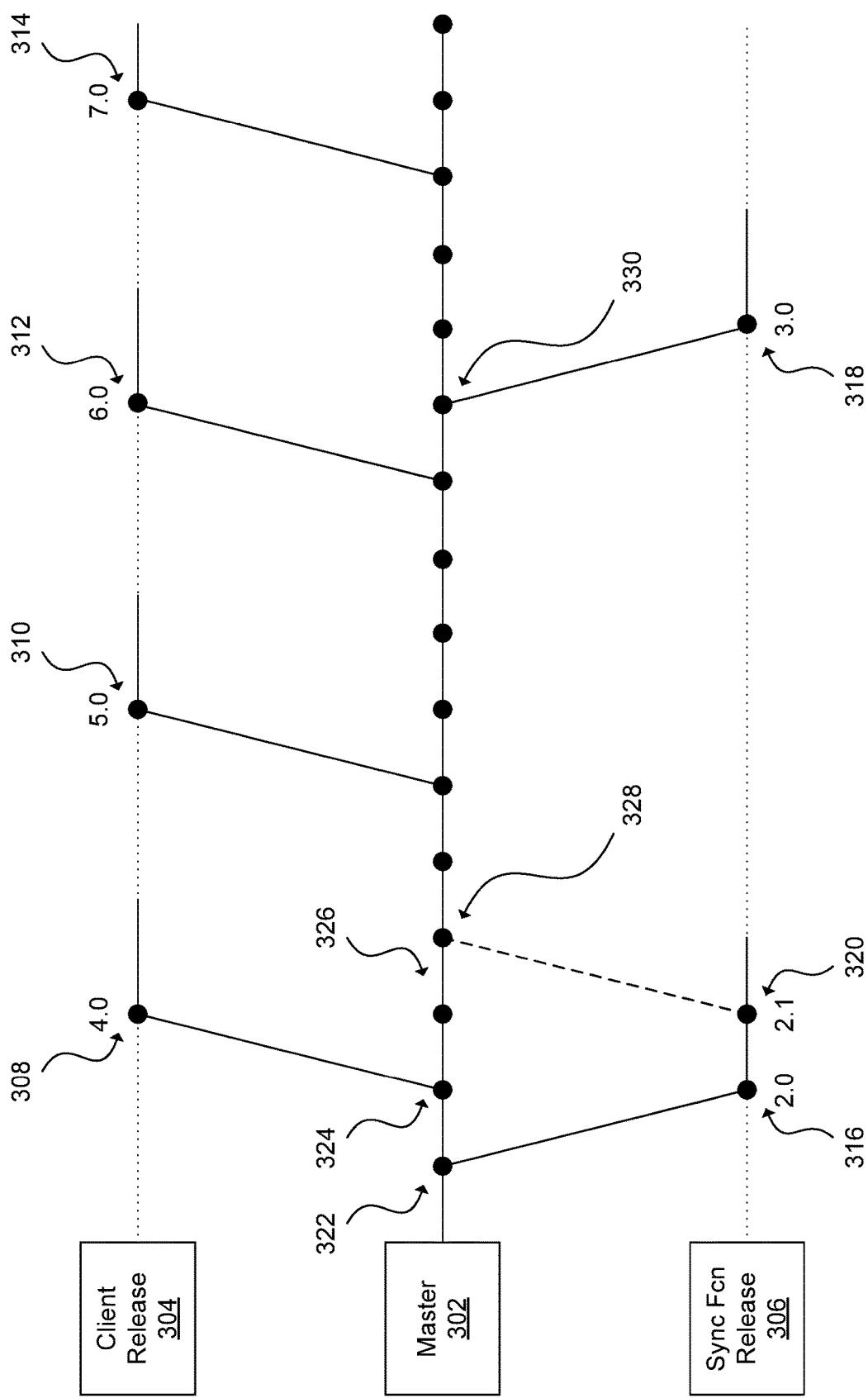
FIG. 3 shows an exemplary work flow for software development.

FIG. 3 shows an exemplary work flow 300 for developing and releasing software, such as client software 202 of FIG. 2. Work flow 300 can include master branch 302, client application release branch 304, and client-side synchronization functionality release branch 306. Although represented here as multiple separate branches, it should be understood that branches 302, 304, and 306 may reside in a single repository of a version control system that associates files of the repository with metadata (e.g., tags, labels, version numbers, etc.) indicating versions, branches, or other identifying information for the source code.

In this example, work flow 300 is a centralized work flow in which master branch 302 is a central hub that an entire software team uses to synchronize their work. Developers can have a copy or clone of master branch 302 on their own computing devices. Developers can push their changes to the centralized repository and pull changes made by co-developers from master branch 302.

Other embodiments may implement other types of work flows, such as a peer-to-peer or forking work flow, an integration manager work flow, or a hierarchical work flow. In the peer-to-peer or forking work flow, each developer can maintain a public repository (which can be a fork of an existing codebase) and a private repository. A developer can work within her private repository and push changes to her public repository when the changes are complete. The developer can pull co-developers' work from the co-developers' respective public repositories to the developer's private repository. In the integration manager work flow, developers push changes to their respective public repositories similarly to the peer-to-peer work flow but there is one authoritative or canonical repository rather than multiple independent repositories. A person or group responsible for the authoritative repository, known as an integration manager, pulls work from the developers' respective public repositories into the centralized repository and the developers synchronize their private repositories with the centralized repository before pushing new changes. The hierarchical work flow utilizes multiple integration managers each responsible for a sub-repository that holds source code integrated from multiple developers and that ultimately synchronizes with an authoritative repository maintained by a super-integration manager. The hierarchical work flow can include any number of levels of sub-repositories.

In this example, release branches 304 and 306 can be long-lived or permanent branches of master branch 302. In other examples, release branches 304 and 306 can be short-lived, single-purpose branches. In either case, release branches 304 and 306 can effectively freeze development at certain revisions of master branch 302 and can limit updates to release branches 304 and 306 to those changes that further stabilize the source code (e.g., bug fixes) or otherwise prepare the branches for release (e.g., updating configuration information).

Each point in work flow 300 can represent a set of source code commits or a new revision of client software 202 with points 308, 310, 312, and 314 marking major version updates of client software 202 (i.e., 4.0, 5.0, 6,0, and 7.0, respectively); points 316 and 318 marking major version updates of client-side synchronization functionality $220_i$ (i.e., 2.0, and 3.0, respectively); and point 320 marking a minor version update of client-side synchronization functionality $220_i$ (e.g., 2.1). Despite client-side synchronization functionality $220_i$ being closely integrated with other portions of client software 202 (e.g., client-side synchronization functionality $220_i$ has mutual dependencies with other portions of client software 202), development, testing, and release of client-side synchronization functionality $220_i$ and client software 202 can run on different schedules.

For example, a single source code repository can include source code for client-side synchronization functionality $220_i$ and source code for the remaining portions of client software 202. In an embodiment, client-side synchronization functionality $220_i$ can be isolated from the remaining portions of client software 202. For instance, a particular directory can store the source code for the remaining portions of client software 202 (e.g., 'path/to/client_app/') and a subdirectory can store the source code for client-side synchronization functionality $220_i$ (e.g., 'path/to/client_app/sync_fcn/'). Source code for client software 202 can also include an interface for the remaining portions of client software 202 to call upon to obtain the appropriate revision or version of client-side synchronization functionality $220_i$.

The interface can hide details of instantiation of client-side synchronization functionality $220_i$ from the remaining portions of client software 202, and the interface can provide the appropriate revision or version at run time. In this manner, development of client-side synchronization functionality $220_i$ and the remaining portions of client software 202 can run on different tracks but no group of developers may be overburdened with integration of separate repositories, submodules, separate branches, and so forth, and no additional complexity may be added to the work flows of various groups of developers. For example, changes that span client-side synchronization functionality $220_i$ and the remaining portions of client software 202 can be straightforward because the respective source code for these logical segments are in a single source code repository.

In some embodiments, a build tool, package manager, or similar tool, can automate release of packages of client software 202 including multiple versions of client-side synchronization functionality $220_i$. The build or packaging tool can use a release schema, such as shown in Table 1, to specify one or more packages including multiple specific versions of client-side synchronization functionality $220_i$. For example, the release schema of Table 1 sets forth a 'super-privileged' package including 'alpha,' 'beta,' and 'stable' versions of client-side synchronization functionality $220_i$; a 'privileged' package including the 'beta' and 'stable' versions of client-side synchronization functionality $220_i$; and a 'regular' package including the 'stable' version of client-side synchronization functionality $220_i$. The build tool can use the release schema to create each package. For example, the build or packaging tool can create subdirectories 'path/to/client_app/sync_fcn_alpha/,' 'path/to/client_app/sync_fcn_beta/,' and 'path/to/client_app/sync_fcn_stable/' in the root directory of client software 202 (i.e., 'path/to/client_app/') and pull the versions of the source code pointed to in the release schema to populate the respective subdirectories. For the 'super-privileged' package, the build tool can package the subdirectories 'path/to/client_app/sync_fcn_alpha/,' 'path/to/client_app/sync_fcn_beta/,' and 'path/to/client_app/sync_fcn_stable'; for the 'beta package,' the build or packaging tool can package the subdirectories 'path/to/client_app/sync_fcn_beta/' and 'path/to/client_app/sync_fcn_stable'; and for the 'stable' package, the build or packaging tool can package the subdirectory 'path/to/client_app/sync_fcn_stable/.'

In some embodiments, source code for client software 202 may use relative paths to link dependencies and other techniques to support multiple versions of client-side synchronization functionality $220_i$ in one executable file. For example, instead of linking to a dependency using an absolute path, a data object of client-side synchronization functionality $220_i$ that depends on other data objects of client-side synchronization functionality $220_i$ (i.e., a logical segment of a codebase expressing a dependency on itself) can use relative paths to link dependencies to those other data objects. Alternatively or additionally, source code of the remaining portions of client software 202 having a dependency on client-side synchronization functionality $220_i$ can call upon source code in a static location (e.g., '/path/to/client_app/sync_fcn_boundary') that returns a data object of an unknown class but implements a method or an interface known to the remaining portion of client software 202 (e.g., a factory method pattern or an abstract factory pattern as discussed elsewhere herein).

Returning to FIG. 3, point 322 can correspond to version 3.x of client software 202, where x may be the number of commits or revisions of master branch 302 since a release of version 3.0. The source code commits or revision may include configuration information and/or a release schema (e.g., Table 1) that can define a 'stable' version of client-side synchronization functionality $220_i$ as version 1.p (not shown), where p can be the number of commits or revisions since a last stable release; a 'beta' version as version 1.q (not shown), where q can be a number of commits or revisions between version 1.p and the head of client-side synchronization functionality $220_i$; and an 'alpha' version as version 1.r, the head of client-side synchronization functionality $220_i$ or the latest set of source code commits or revision of master branch 302 that includes changes to client-side synchronization functionality $220_i$ (in this example, point 322/version 1.r can be the head of client-side synchronization functionality $220_i$ at a time that version 1.p is designated as 'stable' and version 1.q is designated as 'beta').

Point 322 can mark completion of an evaluation and testing period indicating that the current 'beta' version of client-side synchronization functionality $220_i$ is sufficiently stable such that it can "graduate" to become the new 'stable' version. Master branch 302 can branch off a new version of client-side synchronization functionality $220_i$ as indicated by the line from point 322 to point 316. In the configuration information or release schema, the 'alpha' version of client-side synchronization functionality $220_i$ can now point to 316 (i.e., version 2.0), the 'beta' version can point to version 1.r (i.e., point 322), and the 'stable' version can point to version 1.q (not shown). In some embodiments, the build or packaging tool can automatically update the configuration information or release schema based on a new major or minor release of client-side synchronization functionality $220_i$ but release of client software 202 to users may only occur on a new major or minor release of client software 202.

Hence, on the next release of client software 202, as indicated by the segment from point 324 to point 308, the build or packaging tool can use the updated configuration information or release schema to pull the source code for the 'alpha' version of client-side synchronization functionality $220_i$ from client-side synchronization functionality release branch 306 at point 316, the 'beta' version from version 1.r (i.e., point 322), and the 'stable' version from version 1.q (not shown).

Testing on release branch 306 at a time between point 316 and 320 can result in the discovery of a significant bug requiring resolution via a set of commits or revision of client-side synchronization functionality $220_i$ from version 2.0 to version 2.1 (i.e., point 320). As discussed, this can automatically trigger a merge of these changes from release branch 306 to master branch 302, as indicated by the dashed line from point 320 to point 328. In this example, minor version number of client-side synchronization functionality $220_i$ changes from 2.0 to 2.1 to indicate that the commits from point 316 to 320 included no changes to the interface of client-side synchronization functionality $220_i$ exposed to the remaining portions of client software 202 (i.e., the source code in '/path/to/client_app/sync_fcn_boundary'). On the other hand, the change of the major version number of client-side synchronization functionality $220_i$, such as indicated by the line from point 330 to point 318 (i.e., from version 2.1 to 3.0), may be due to a change to that interface. Other embodiments may use various version numbering schemes known to those of ordinary skill in the art.

Work flow 300 can also simplify the work flow of an operations team supporting client software 202. For example, a package of client software 202 deployed to user accounts of end users can include multiple 'stable' versions of client-side synchronization functionality $220_i$ including a latest version and a previous version. In the event of a serious error caused by the latest stable version, content management system 102 can direct client-side synchronization functionality 220$_i$ to execute the previous version. As an example, upon discovering the bug between points 316 and 320 on client-side synchronization functionality release branch 306, the operations team can configure content management system 102 to cause client software 202 to utilize version 1.p of client client-side synchronization functionality 220$_i$ instead of version 1.q. Thus, the operations team can minimize the downtime for users while developing a more permanent fix. Alternatively or in addition, the operations team can modify the configuration information or release schema to have the 'stable' version point to a previous stable version (e.g., version 1.p) and trigger a build and deployment of client software 202.

Figure 4:
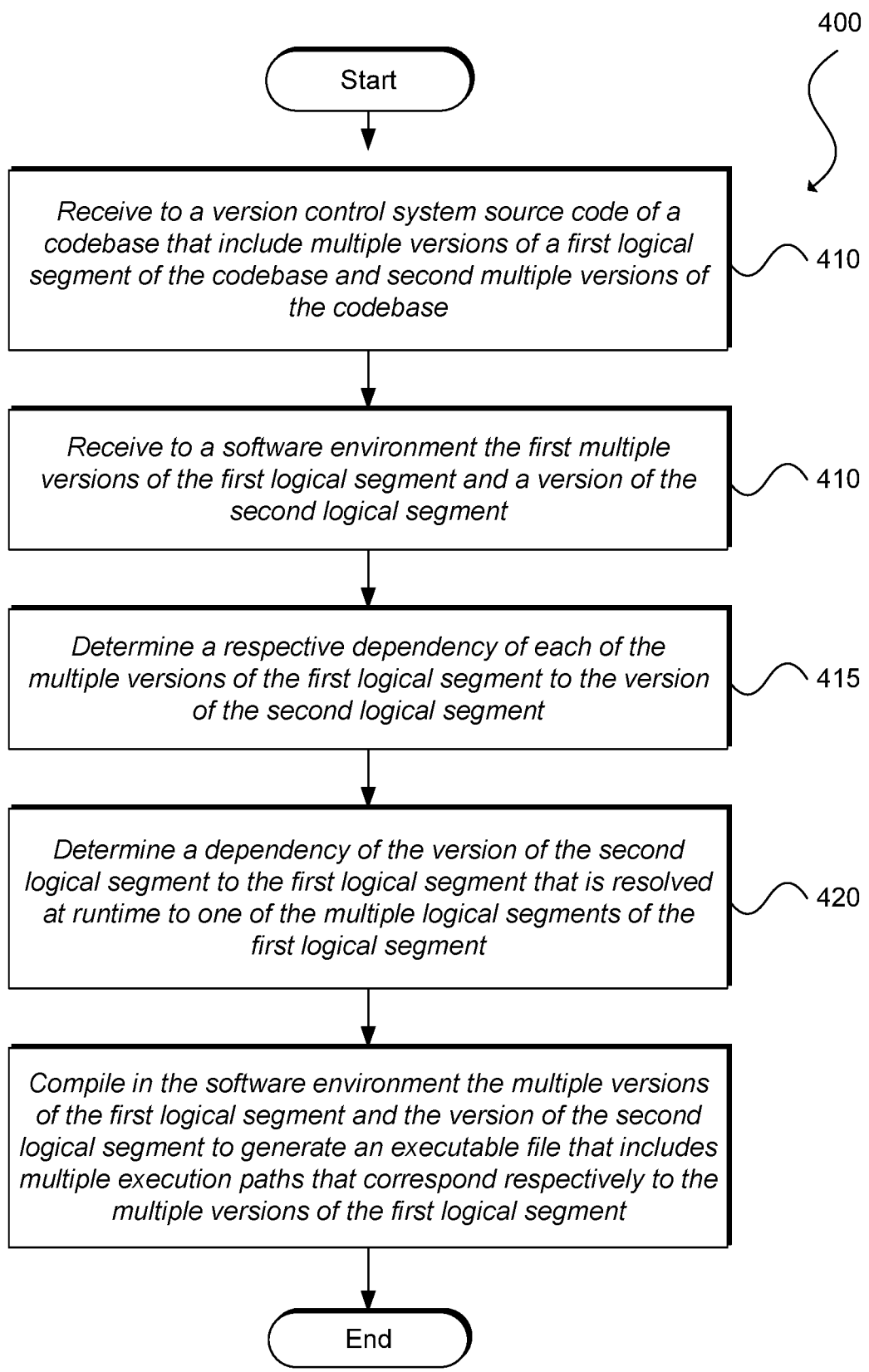
FIG. 4 shows an exemplary method for packaging multiple versions of a logical segment of a codebase for compilation as an executable file.

FIG. 4 shows an exemplary method 400 for packaging multiple versions of a logical segment of a codebase for compilation as an executable file. It should be understood that, for any process discussed herein, there can be additional, fewer, or alternative steps performed in similar or alternative orders, or in parallel, within the scope of various embodiments unless otherwise stated. Method 400 can be implemented in a software environment for creating/updating, executing, managing, and/or testing software such as content management system 102 of FIG. 1 and client software 202 of FIG. 2. The software environment can be a local environment, such as a software developer's or an end user's computing device; a development environment for creating, updating, and testing software; a build environment for integrating and building/packaging software; a testing/staging/pre-production/pre-release environment used for preparing a software product or service for wider dissemination; a production/release environment for live operation and providing software products or services to end users; or other suitable software environment.

The software environment can include a version control system, revision control system, source code control system, and so forth, such as Concurrent Versions System (CVS), Git®, Mercurial, Perforce, Subversion®, among many possibilities. The software environment can also include a build and/or packaging tool for generating a software distribution, such as build/packaging tools like Maven® or Gradle® for Java®, pip or Conda for Python®, RubyGems or Bundler for Ruby, Ivy™ or CMake for C++, or other suitable open-source or proprietary build/packaging tools for these or other software programming languages known to one of ordinary skill. The build/packaging tools can run out of the box with some configuration or may operate in combination with scripts (e.g., JavaScript®, Perl, PHP, etc.) or applications for integrating the tools with a variety of software environments.

Method 400 can begin at step 405 in which a version control system can receive source code for multiple versions of multiple logical segments of a codebase, such as multiple versions of a first logical segment of the codebase and a version of second logical segment of the codebase in some embodiments. For example, developers or integration managers may push (e.g., check in, commit, merge, etc.) source code to the version control system during the course of development and/or integration of a codebase. A codebase can be a collection of source code and other related data (e.g., configuration data, machine-generated data, binary files, etc.), used to build a software system, application, or component (e.g., libraries, plug-ins, drivers, or other stand-alone units of software). A logical segment of a codebase can group similar functionality provided by the codebase but may not necessarily be a substantially or completely self-contained module, such as a third party library or plug-in. For example, a logical segment can have dependencies on other segments of the codebase. That is, at least a portion of the source code of the logical segment may require (e.g., import, include, load, use, etc.) at least a portion of the source code of other segments of the codebase for installation and/or execution. Likewise, other segments of the codebase can have dependencies on a logical segment. That is, at least a portion of the code of the other segments of the codebase may require at least a portion of the code of the logical segment in order to compile and/or execute. A single source code repository can store the codebase. For purposes of illustration only, the codebase can correspond to a client application of an online synchronized content management system (CMS), such as client software 202 of FIG. 2, and the logical segment can correspond to client-side synchronization functionality 220$_i$ of client software 202. It will be understood to those of ordinary skill in the art that the disclosed technology can be applicable to many other types of software.

At step 410, a user of a build or packaging tool (or an automated build/packaging system) can retrieve (e.g., checkout, clone, fetch, pull, etc.) the multiple versions of the first logical segment and a version of the second logical segment from the VCS to a software environment, such as a local or user environment, a development environment, a build environment, a staging environment, a production environment, or other suitable environment. In an embodiment, retrieving the source code can include analyzing configuration data, such as discussed with respect to Table 1, to determine the versions of the first and second logical segments to send to the software environment. The build/packaging tool may retrieve source code for one environment or many environments during the same period of time. For example, there may be separate release environments for providing software products or services to different sets of user accounts. In some embodiments, the build/packaging tool may retrieve the source code to one environment having multiple virtual environments—environments that are logically isolated from one another but residing in a single (logical or physical) environment.

At step 415, a dependency management component of the build/packaging tool or a stand-alone dependency management tool may resolve respective dependencies of each of the multiple versions of the first logical segment to the single version of the second logical segment. In an embodiment, a respective dependency of a first portion (e.g., variable, function, class, module, etc.) of each version of the first logical segment can map to the single version of the second logical segment of the codebase. A dependency can be direct such that a variable, function, class, module, etc. (i.e., a data object) of a version of the first logical segment requires for compilation and/or execution a data object of the second logical segment of the codebase. Some dependencies may be indirect such that a data object of a version of the first logical segment may require for compilation and/or execution one or more intermediate data objects that ultimately depend on one or more data objects of a version of the second logical segment of the codebase for compilation and/or execution.

Method 400 may proceed to step 420 in which a dependency manager resolves a dependency of a version of the second logical segment to the first logical segment. In particular, the dependency resolves to one of multiple versions of the first logical segment at run time. Implementing step 420 may largely depend on the programming language used to implement the codebase and the extent to which the language allows a programmer to customize loading, linking, binding, and/or dispatching of source code, interpreted bytecode, and/or machine code. These processes may be interchangeable depending on the programming language. Binding can refer to the general process of associating a more abstract entity to less abstract subject matter, such as from a variable to its type or value, or from a function to its (source or machine) code. Binding can occur at design time, compile time, link time, or run time. Binding at design time may be based on the design of a programming language, such as binding the symbol '+' to the addition operation or the word 'class' to a user-defined data object of an object-oriented programming language. Binding can also occur at compile time, such as binding variables to types in statically typed languages like Java®, C++, and other C-based languages. Binding at link time can involve combining code into a full program, such as binding global and static variables to addresses in C++, C, and other C-based languages. Binding at run time can happen during execution of a program, such as binding types at run time in dynamically typed programming languages like Python®, Ruby, and Smalltalk. Generally, a binding is dynamic or late when it occurs at run time and a binding is static or early when it occurs before run time.

An example approach for resolving a dependency of a second logical segment of a codebase to one of multiple versions of a first logical segment of the codebase is to assign each version of the first logical segment a respective namespace, e.g., sync_fcn_alpha, sync_fcn_beta, and sync_fcn_stable, and dynamically changing scope in order for a selected version of the first logical segment to execute. A namespace is a kind of container for named data objects. Certain programming languages look up named data objects on the basis of a current scope of execution of a line of code, such as first associating a named data object with a local data object having the same name (i.e., local scope), secondly associating the named data object with any data objects within one or more blocks or enclosures (i.e., nested scope) having the same name, and finally associating the named data object with a globally defined data object having the same name (i.e., global scope). Certain programming languages include additional scopes (e.g., file scope, module scope, built-in scope, etc.) and/or different lookup priorities depending on scope. A dependency of a version of a second logical segment of a codebase may resolve to one of multiple versions of a first logical segment of the codebase using dynamic namespaces and/or scopes.

Another example technique for mapping a dependency of one version of a second logical segment of a codebase to one of multiple versions of a first logical segment of the codebase is dynamically updating a system path or the path that an execution engine or interpreter looks to for finding a data object. For example, an execution engine or interpreter may bind named data objects to the first data object having the same name by sequentially searching the system path one by one until locating the first data object. A programming language may allow for updating the system path at run time to facilitate mapping a dependency of a single version of a second logical segment of a codebase to one of multiple versions of a first logical segment of the codebase.

Another example strategy for binding a dependency of a version of a second logical segment of a codebase to one of multiple versions of a first logical segment of the codebase may entail customizing an import system of a programming language. An import system may comprise a finder and a loader (sometimes referred to as an importer when combined). The finder can include logic for locating a loader that includes logic for loading a data object. Modifying one or more of these components, e.g., a finder, loader, or importer, or similar components, can enable a dependency of one version of the second logical segment to map to one of many versions of the first logical segment at run time.

Although these examples utilize a dynamically typed language, such as Python®, similar techniques can be used to determine a dependency of one version of a second logical segment of a codebase to one of multiple versions of a first logical segment of the codebase for other dynamically typed languages or statically typed languages. For example, other ways of determining a dependency of a version of a second logical segment of a codebase to one of several versions of a first logical segment of the codebase may include dynamic dispatch or reflection. Dynamic dispatch can involve selecting a particular implementation of a polymorphic entity at run time. Dynamic dispatch may differ from dynamic binding because the former binds a name to a polymorphic entity at compile time, but dispatch allows for selection of the particular implementation during execution. Reflection monitors execution of a subset of a program and allows for modification of that subset according to one or more conditions. For example, in Java®, reflection enables inspection of classes, interfaces, variables, and functions at run time without necessarily knowing the names of these data objects at compile time. Java® reflection also enables instantiation of new data objects and invocation of the methods of new data objects.

After resolving one or more respective dependencies from each version of the first logical segment to the single version of the second logical segment at step 415 and the dependency of the single version of the second logical segment to one of the multiple versions of the first logical segment during run time at step 420, method 400 may continue to step 425, compilation of multiple versions of a first logical segment of a codebase and a version of a second logical segment of the codebase to generate an executable file that includes multiple execution paths that correspond respectively to the multiple versions of the first logical segment. In some embodiments, unit testing of the codebase may also occur to ensure that it is possible to reach each execution path. In some cases, a package for the codebase can include the executable file and other data necessary to run the executable file upon distribution of the package to another software environment, such as from a staging/testing environment to a production environment or from a release environment to an end user environment. In other cases, upon successful compilation and unit testing of the executable file, a packaging manager can generate a package that comprises configuration data for creating the executable file or a portion of the executable file from source code and other tools and data (e.g., compiler, execution engine or interpreter, data necessary to run on a particular platform, binary or compiled extensions, and download or location information indicating the location(s) of source code and other tools and data, etc.).

Figure 5:
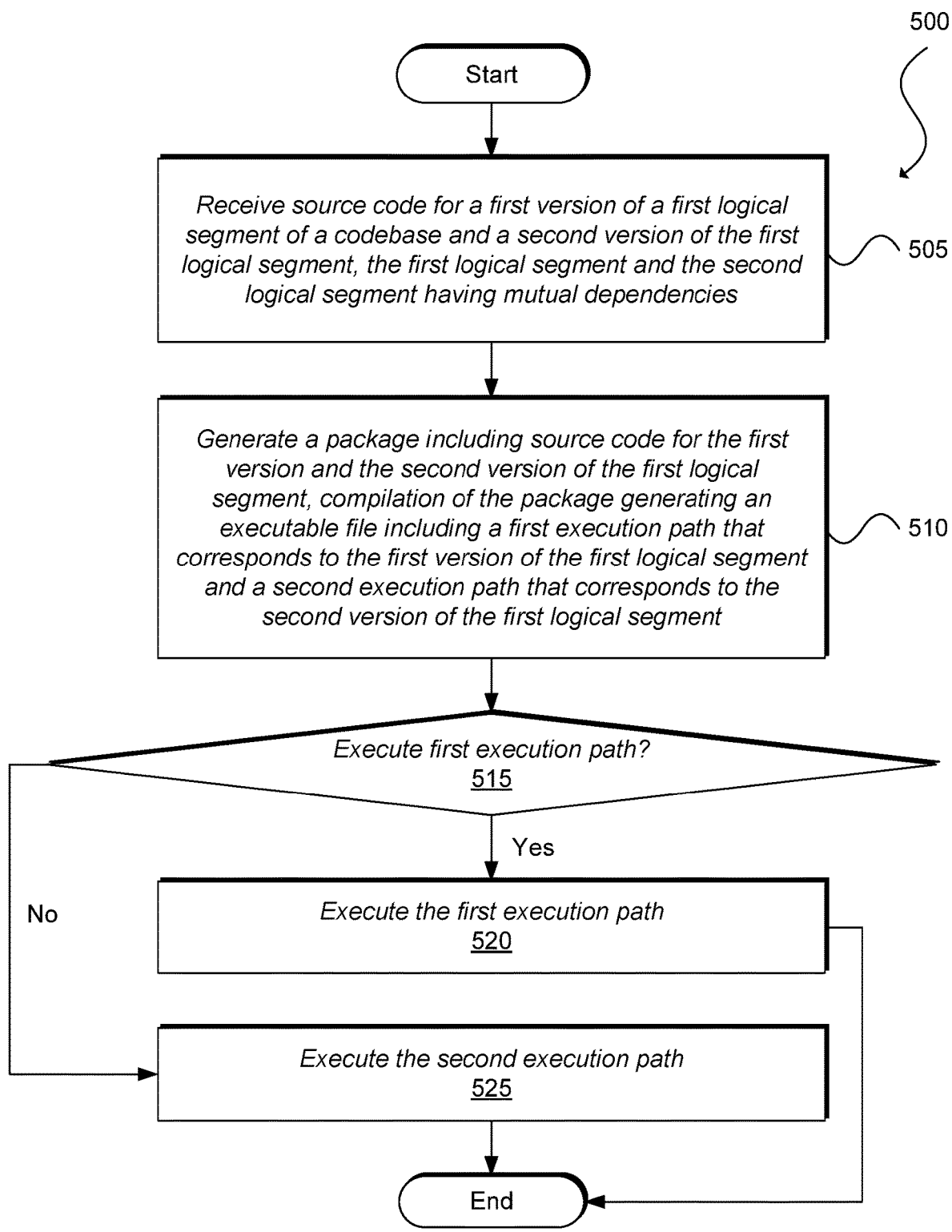
FIG. 5 shows an exemplary method for controlling execution of a specified version of a logical segment of a codebase.

FIG. 5 shows an exemplary method 500 for controlling execution of a specified version, among multiple versions, of a first logical segment, among multiple logical segments, of a codebase. It should be understood that, for method 500 and any other process discussed herein, there can be additional, fewer, or alternative steps performed in similar or alternative orders, or in parallel, within the scope of various embodiments unless otherwise stated. Method 500 can be performed in a software environment having the same or different components than that of FIG. 4. Method 500 may begin at step 505, where a VCS can receive source code for a first version of a first logical segment of a codebase, a second version of the first logical segment, and a second logical segment of the codebase. As discussed, the first logical segment may correspond to a release schedule that is different from the release schedule of the second logical segment. Releases may be associated with version numbers using a variety of numbering schemes, such as including one or more alphanumeric codes for conveying a major version, a minor version, a build number, a revision number, a release stage, or other information about a particular package of software.

At step 510, a user of the software development environment or the software development environment itself (e.g., via regularly scheduled builds; event-based builds such as based on committing changes to a specific branch, creating a new branch, tagging or labeling a revision, etc.; and other possibilities known to those of ordinary skill) can use a build or packaging tool to create a package including the source code for the first version of the first logical segment, the second version of the first logical segment, and a second logical segment of the codebase. For example, the package may be built using the same or a similar process to the process of FIG. 4. Compilation of the package, such as by the software development environment for distributing a pre-compiled binary file or an end user using a build tool provided with the package, can generate an executable file including a first execution path that corresponds to the first version of the first logical segment and a second execution path that corresponds to the second version of the first logical segment. For example, compiling a package provided by the software development environment can generate client software 202 having client-side synchronization functionality $220_i$ and client-side synchronization functionality $220_j$.

At step 515, a computing device can execute the executable file, which may invoke conditional logic for determining whether the computing device should execute the first execution path or the second execution path. The computing device itself may apply the conditional logic, or the executable file can be a client application that communicates with a server that determines whether the computing device executes the first execution path or the second execution path. The conditional logic may be based on numerous factors, such as user account information and/or user account group information, computing device characteristics, a developmental state of the logical segment and/or the codebase, a state of a server with which the computing device communicates, and other factors discussed throughout herein. For example, in the case that the codebase corresponds to a client application of a CMS, the client application can communicate with the CMS and the CMS can determine whether the client application should execute a first client-side synchronization implementation or a second client-side synchronization implementation.

If it is determined at step 515 that the computing device should execute the first execution path, the computing device executes the first execution path at step 520. Otherwise, the computing device executes the second execution path at step 525. For example, in those embodiments that the codebase includes source code for a client application of a CMS, the client application may send a synchronization request to the CMS, and the CMS can include in a synchronization response data for executing the first execution path or the second execution path depending on application of the conditional logic.

Figure 6A:
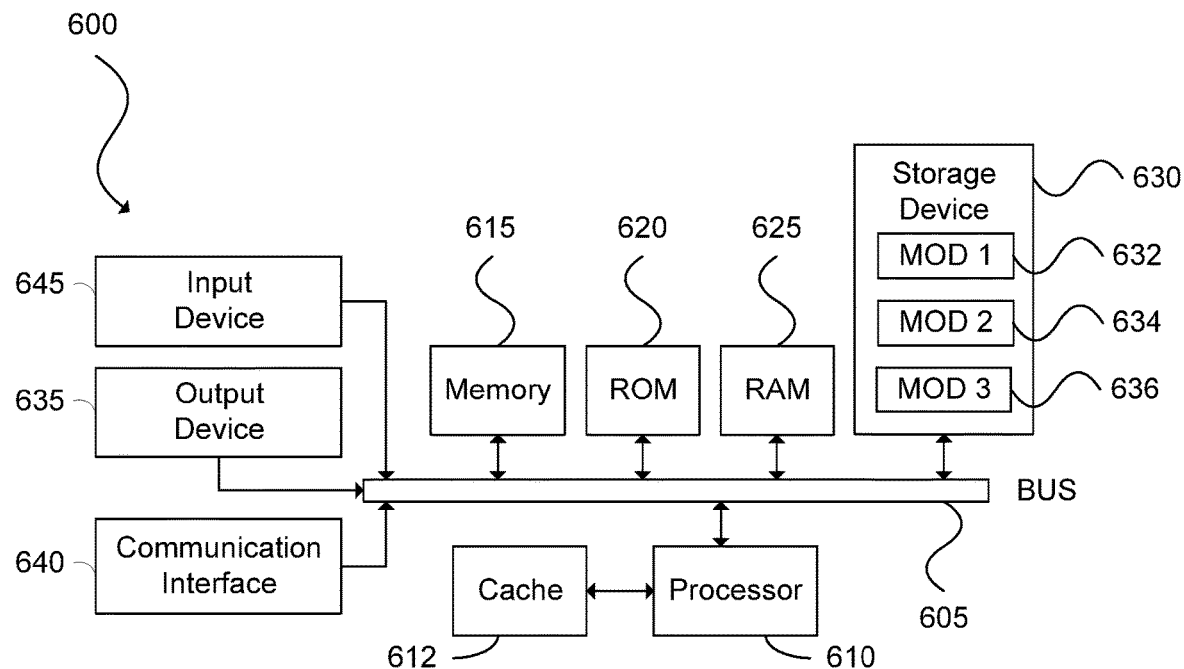
FIG. 6A shows a first exemplary system.
Figure 6B:
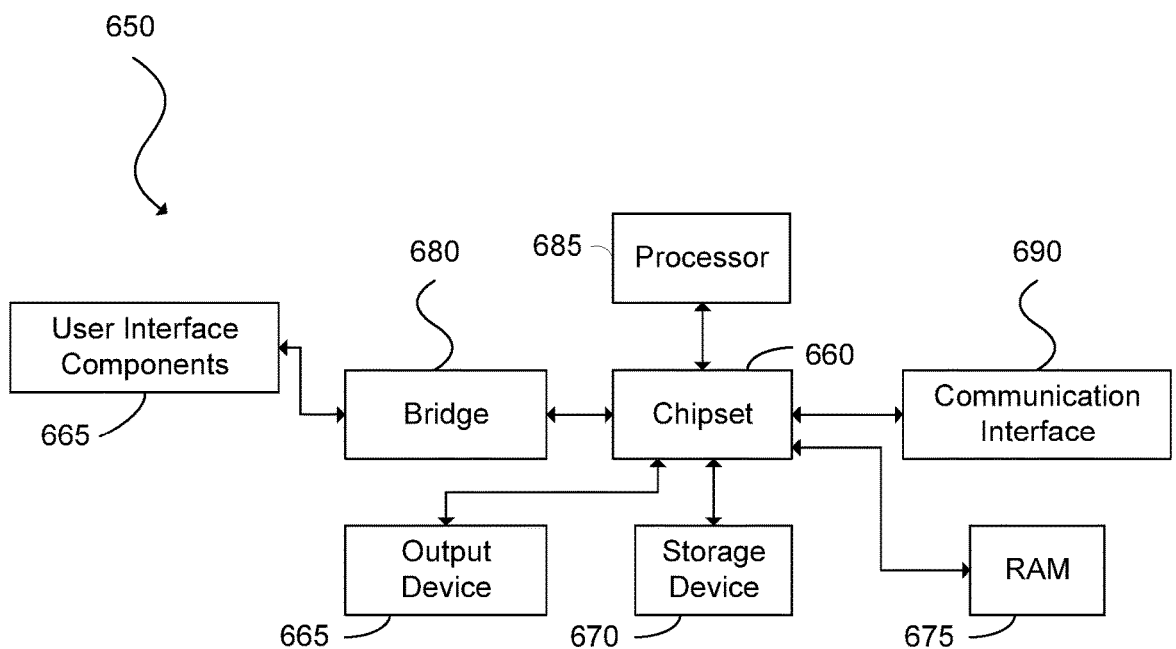
FIG. 6B shows a second exemplary system.

FIG. 6A and FIG. 6B show exemplary system embodiments. The more appropriate embodiment will be apparent to those of ordinary skill in the art when practicing the present technology. Persons of ordinary skill in the art will also readily appreciate that other system embodiments are possible.

FIG. 6A illustrates an architecture for conventional bus computing system 600 wherein the components of the system are in electrical communication with each other using bus 605. Exemplary system 600 includes processing unit (CPU or processor) 610 and system bus 605 that couples various system components including system memory 615, such as read only memory (ROM) 620 and random access memory (RAM) 625, to processor 610. Bus computing system 600 can include a cache of high-speed memory connected directly with, in close proximity to, or integrated as part of the processor 610. Bus computing system 600 can copy data from memory 615 and/or storage device 630 to cache 612 for quick access by processor 610. In this way, cache 612 can provide a performance boost that avoids processor 610 delays while waiting for data. These and other components can control processor 610 to perform various actions. Other system memory 615 may be available for use as well. Memory 615 can include multiple different types of memory with different performance characteristics. Processor 610 can include any general purpose processor and a hardware component or software functionality, such as functionality 1 632, functionality 2 634, and functionality 3 636 stored in storage device 630, to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with bus computing system 600, input device 645 can represent any number of input mechanisms, such as a microphone for speech, a touch-sensitive screen for gesture or graphical input, keyboard, mouse, motion input, speech and so forth. Output device 635 can also be one or more of a number of output mechanisms known to those of skill in the art. In some instances, multimodal systems can enable a user to provide multiple types of input to communicate with bus computing system 600. Communications interface 640 can generally govern and manage the user input and system output. There is no restriction on operating on any particular hardware arrangement and therefore the basic features here may easily be substituted for improved hardware or firmware arrangements as they are developed.

Storage device 630 can be a non-volatile memory that can be implemented as a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

As discussed, storage device 630 can include software functionalities 632, 634, 636 for controlling processor 610. Other hardware or software functionalities are contemplated. Storage device 630 can be connected to system bus 605. In one aspect, a hardware component that performs a particular function can include the software functionality stored in a computer-readable medium in connection with the necessary hardware components, such as processor 610, bus 605, output device 635, and so forth, to carry out the function.

FIG. 6B illustrates an architecture for a chipset computing system 650 that can be used in executing the described methods and generating and displaying a graphical user interface (GUI). Computing system 650 is an example of computer hardware, software, and firmware that can be used to implement the disclosed technology. Computing system 650 can include processor 655, representative of any number of physically and/or logically distinct resources capable of executing software, firmware, and hardware to perform identified computations. Processor 655 can communicate with chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. Bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to computing system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage device 670 or RAM 675. Further, the machine can receive inputs from a user via user interface components 685 and execute appropriate functions, such as browsing functions by interpreting these inputs using processor 655.

It can be appreciated that exemplary computing systems 600 and 650 can have more than one processor or be part of a group or cluster of computing devices networked together to provide greater processing capability.

For clarity of explanation, in some instances the present technology may be presented as including individual functional blocks representing devices, device components, steps or routines in a method embodied in software, or combinations of hardware and software.

Any of the steps, operations, functions, or processes described herein may be performed or implemented by a combination of hardware and software functionalities, alone or in combination with other devices. In an embodiment, a software functionality can be software that resides in memory of a client device and/or one or more servers of a content management system and perform one or more functions when a processor executes the software associated with the functionality. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving source code for a first version of a first logical segment of a codebase and a second version of the first logical segment, the first logical segment having a first dependency on a second logical segment of the codebase, the second logical segment having a second dependency on the first logical segment;
generating a first package including the source code for the first version of the first logical segment and the second version of the first logical segment, wherein compilation of the package generates an executable file including a first execution path that corresponds to the first version of the first logical segment and a second execution path that corresponds to the second version of the first logical segment;
providing the generated first package to a user account;
selecting the first execution path during a first period of time distinct from a second period of time;
causing, when the first execution path is selected, the first execution path to be executed during the first period of time that a first computing device executes the executable file;
selecting the second execution path during the second period of time; and
causing, when the second execution path is selected, the second execution path to be executed during the second period of time that the first computing device executes the executable file, wherein the causing the first execution path to be selected during the first period of time and the causing the second execution path to be selected during the second period of time includes sending a command to the user account identifying the execution path to be selected.

2. The computer-implemented method of claim 1, further comprising:
receiving user account information associated with the first computing device; and
causing the first execution path to be executed by the first computing device based at least in part on the user account information.

3. The computer-implemented method of claim 1, further comprising:
determining an execution path per network session.

4. The computer-implemented method of claim 1, further comprising:
updating configuration data specifying that the first package includes the source code of the first version of the first logical segment of the codebase and the second version of the first logical segment,
wherein the first package is generated based at least in part on the configuration data.

5. The computer-implemented method of claim 1, further comprising:
providing the first package including the executable file to a first user account group; and
providing a second package that includes second source code of a third version of the first logical segment of the codebase to a second user account group.

6. The computer-implemented method of claim 1, further comprising:
receiving user account information associated with the first computing device; and
determining that the first package includes the source code for the first version of the first logical segment of the codebase and the second version of the first logical segment based at least in part on the user account information.

7. The computer-implemented method of claim 1, further comprising:
creating a first sub-repository in a repository storing the codebase;
receiving first source code for the first version of the first logical segment of the codebase to the first sub-repository;
creating a second sub-repository in the repository; and
receiving second source code for the second version of the first logical segment to the second sub-repository.

8. The computer-implemented method of claim 1, wherein a type of a data object corresponding to the first execution path is determined at run time.

9. The computer-implemented method of claim 1, wherein the codebase corresponds to a client application of a content management system, and the first logical segment of the codebase corresponds to a client-side synchronization functionality.

10. The computer-implemented method of claim 9, further comprising:
receiving from the first computing device a first synchronization request during the first period of time;
sending to the first computing device a first synchronization response that includes first data for executing the first execution path during the first period of time;
receiving from the first computing device a second synchronization request during the second period of time; and
sending to the first computing device a second synchronization response that includes second data for executing the second execution path during the second period of time.

11. The computer-implemented method of claim 9, further comprising:
determining an execution path per synchronization request.

12. The computer-implemented method of claim 1, further comprising: applying a conditional logic to determine whether to select the first execution path or the second execution path.

13. A computer-implemented method, comprising:
executing an executable file compiled from a package including source code for a first version of a first logical segment of a codebase and a second version of the first logical segment, the first logical segment having a first dependency on a second logical segment of the codebase, the second logical segment having a second dependency on the first logical segment, the executable file including a first execution path that corresponds to the first version of the first logical segment and a second execution path that corresponds to the second version of the first logical segment;
instantiating the first execution path during a first period of time distinct from a second period of time;
executing the first execution path during the first period of time that the executable file is executed when the first execution path is instantiated;
instantiating the second execution path during the second period of time; and
executing the second execution path during the second period of time that the executable file is executed when the second execution path is instantiated,
wherein the first logical segment offers a functionality and the first and second versions of the first logical segment are release branches used to test which version of the first logical segment that offers the functionality is preferred.

14. The computer-implemented method of claim 13, further comprising:
sending a first synchronization request to a content management system during the first period of time;
receiving a first synchronization response that includes first data for executing the first execution path during the first period of time;
sending a second synchronization request to the content management system during the second period of time; and
receiving a second synchronization response that includes second data for executing the second execution path during the second period of time.

15. The computer-implemented method of claim 14, further comprising:
sending, in the first synchronization request, first information that includes a first characteristic of a first computing device, wherein the first synchronization response includes the first data for executing the first execution path based at least in part on the first characteristic; and
sending, in the second synchronization request, second information that includes a second characteristic of a second computing device, wherein the second synchronization response includes the second data for executing the second execution path based at least in part on the second characteristic.

16. The computer-implemented method of claim 15, further comprising:
determining a type of a data object corresponding to the first execution path at run time.

17. A computer-implemented method, comprising:
receiving source code for a first version of a client-side synchronization functionality of a client application of a content management system and a second version of the client-side synchronization functionality, the client-side synchronization functionality having a first dependency on one or more functionalities of the client application that are different from the client-side synchronization functionality, the one or more functionalities having a second dependency on the client-side synchronization functionality;
generating a package including the source code for the first version of the client-side synchronization functionality and the second version of the client-side synchronization functionality, wherein compilation of the package generates an executable file including the first version of the client-side synchronization functionality and the second version of the client-side synchronization functionality;
selecting the first version of the client-side synchronization functionality during a first period of time distinct from a second period of time;
causing, when the first version of the client-side synchronization functionality is selected, the first version to be executed during the first period of time that a first computing device executes the executable file;
selecting the second version of the client-side synchronization functionality during the second period of time; and
causing, when the second version of the client-side synchronization functionality is selected, the second version to be executed during the second period of time that the first computing device executes the executable file,
wherein the first version of the client-side synchronization functionality and second version of the client-side synchronization functionality are release branches used to test which version offers the functionality is preferred.

18. The computer-implemented method of claim 17, further comprising:
updating configuration data specifying that the package includes the source code of the first version of the client-side synchronization functionality and the second version of the client-side synchronization functionality,
wherein the package is generated based at least in part on the configuration data.

19. The computer-implemented method of claim 18, further comprising:
providing the package to a first user account group; and
providing a second package that includes second source code of a third version of the client-side synchronization functionality to a second user account group.

20. The computer-implemented method of claim 17, further comprising:
creating a first sub-repository in a repository storing the source code for the client application;
receiving first source code for the first version of the client-side synchronization functionality to the first sub-repository;
creating a second sub-repository in the repository; and
receiving second source code for the second version of the client-side synchronization functionality to the second sub-repository.

21. A computer-implemented method, comprising:
receiving, by a computing system, source code for a codebase that includes first multiple versions of a first logical segment of the codebase and second multiple versions of a second logical segment of the codebase;
receiving, by the computing system, the first multiple versions of the first logical segment and a first version of the second logical segment;
determining, by the computing system, a respective first dependency between each version in the first multiple versions of the first logical segment and the first version of the second logical segment;
determining, by the computing system, a second dependency between the first version of the second logical segment to the first logical segment that is resolved at run time and one of the versions in the first multiple versions of the first logical segment; and
compiling, by the computing system, each version of the first multiple versions in the first logical segment and the first version of the second logical segment to generate an executable file that includes multiple execution paths that correspond respectively to each version in the first multiple versions of the first logical segment, wherein selection of a version of the first logical segment corresponds to executing one of the multiple execution paths,
wherein the first logical segment offers a functionality and the first and second versions of the first logical segment are release branches used to test which version of the first logical segment that offers the functionality is preferred.

22. The computer-implemented method of claim 21, further comprising:
receiving, by the computing system, a portion of the source code for an interface between the first multiple versions of the first logical segment and the second multiple versions of the second logical segment; and
receiving, by the computing system, a first version of the interface,
wherein the second dependency maps to the interface and a third dependency maps the interface to the first logical segment and is resolved at run time to one of the versions in the first multiple versions of the first logical segment.

23. The computer-implemented method of claim 21, further comprising:
analyzing, by the computing system, configuration data to determine each version in the first multiple versions of the first logical segment for retrieval.

24. The computer-implemented method of claim 21, wherein the codebase corresponds to a dynamically typed language, and wherein determining the second dependency includes at least one of assigning each version in the first logical segment to a respective namespace and changing scope for a selection version in the first logical segment, changing a path that an execution engine or interpreter uses to find a data object of the selected version, or finding and loading the selected version dynamically.

25. The computer-implemented method of claim 21, wherein the codebase corresponds to a statically typed language, and wherein the second dependency is based on at least one of dynamic dispatch or reflection.

* * * * *